United States Patent [19]
Potter

[11] Patent Number: 5,997,228
[45] Date of Patent: *Dec. 7, 1999

[54] CARGO LOCK BLOCK AND CARGO RESTRAINING SYSTEM

[75] Inventor: Lawrence L. Potter, Prophetstown, Ill.

[73] Assignee: Quick Winch Products, Inc., Overland Park, Kans.

[*] Notice: This patent issued on a continued prosecution application filed under 37 CFR 1.53(d), and is subject to the twenty year patent term provisions of 35 U.S.C. 154(a)(2).

[21] Appl. No.: 08/947,128

[22] Filed: Oct. 8, 1997

[51] Int. Cl.⁶ ........................................................ B60P 7/15
[52] U.S. Cl. ........................... 410/155; 410/47; 410/117; 410/143; 410/122; 410/151
[58] Field of Search ................................. 410/47, 77, 94, 410/117, 121, 122, 143, 145, 151, 155; 248/354.1, 354.3, 354.5; 211/105.3; 224/551, 552, 485, 403

[56] References Cited

U.S. PATENT DOCUMENTS

| | | |
|---|---|---|
| Re. 22,507 | 6/1944 | Heigis ................................. 410/155 X |
| 2,473,947 | 6/1949 | Hamstrom .......................... 410/151 X |
| 3,104,085 | 9/1963 | Skladany ............................ 410/121 X |
| 3,329,388 | 7/1967 | Barber .............................. 248/354.1 X |
| 3,762,097 | 10/1973 | Gallo . |
| 4,121,849 | 10/1978 | Christopher . |
| 4,343,578 | 8/1982 | Barnes .................................... 410/151 |
| 4,650,383 | 3/1987 | Hoff ....................................... 410/149 |
| 4,737,056 | 4/1988 | Hunt ....................................... 410/151 |
| 4,770,579 | 9/1988 | Aksamit ............................. 410/121 X |
| 4,772,165 | 9/1988 | Bartkus .................................. 410/139 |
| 5,065,688 | 11/1991 | Moody ................................. 410/47 X |
| 5,082,404 | 1/1992 | Stewart et al. ......................... 410/127 |
| 5,281,063 | 1/1994 | Austin, III ............................. 410/151 |
| 5,549,428 | 8/1996 | Yeatts ....................................... 410/94 |

FOREIGN PATENT DOCUMENTS 547064  10/1957  Canada .................................. 224/552

*Primary Examiner*—Stephen T. Gordon
*Attorney, Agent, or Firm*—Wood, Phillips, VanSanten, Clark & Mortimer

[57] ABSTRACT

Cargo lock blocks are slidably mounted on a cargo restraining bar and have two oppositely directed cargo engaging surfaces, one arcuate and the other with two surface portions at right angles, for selective engagement with a complimentary cargo surface. The lock blocks can be used with cargo of different configurations.

12 Claims, 2 Drawing Sheets

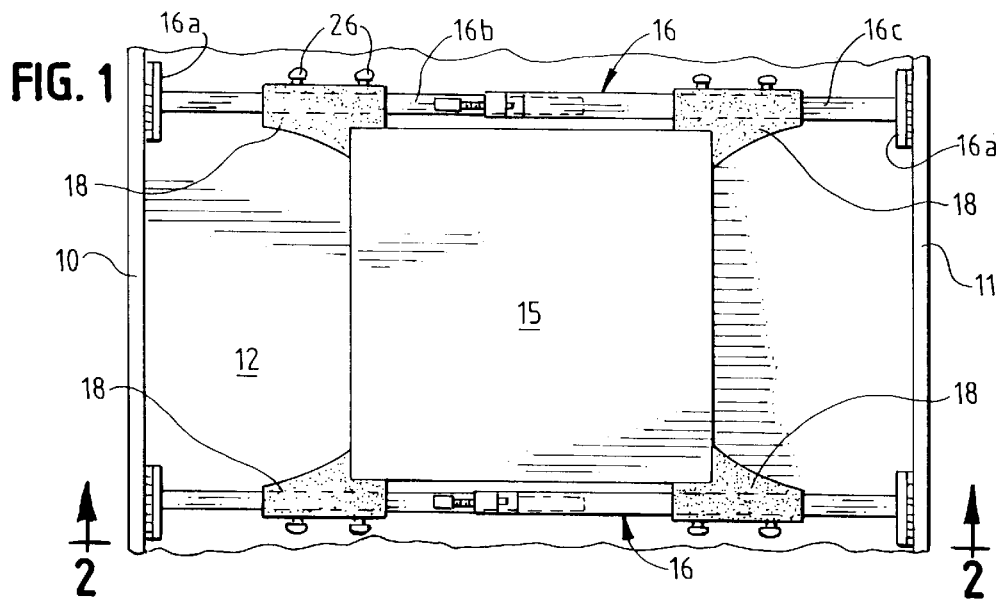
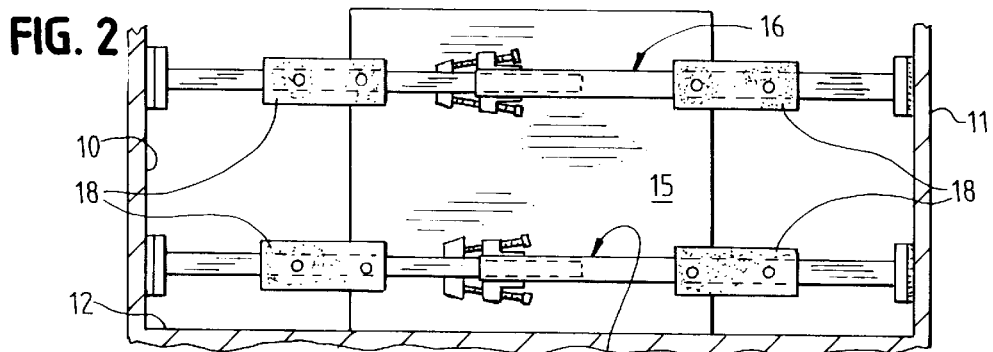
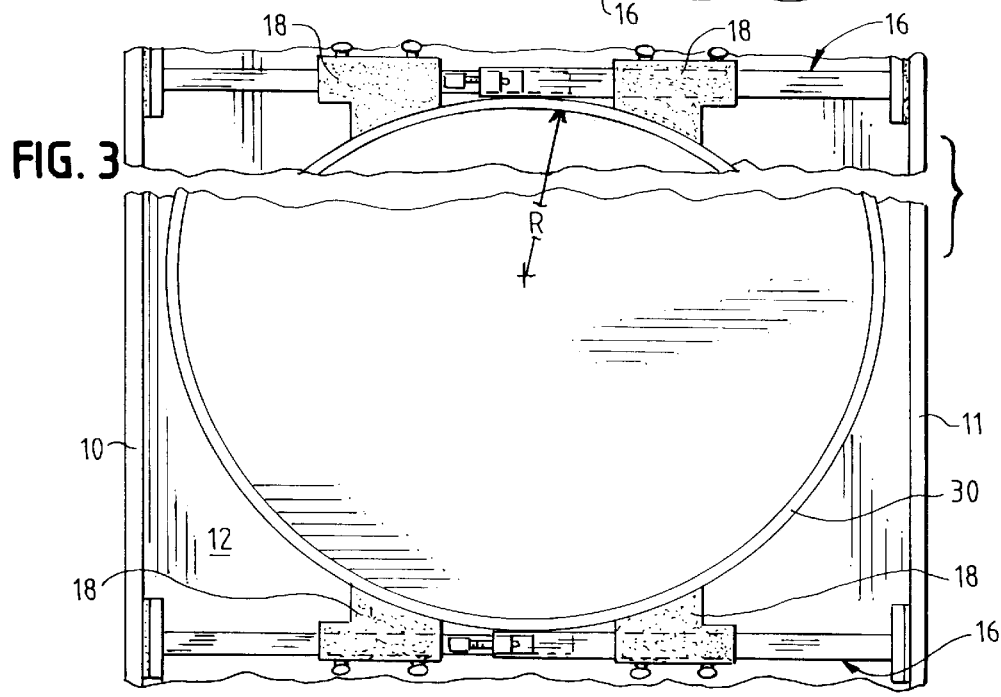

CARGO LOCK BLOCK AND CARGO RESTRAINING SYSTEM

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

Cargo transported in a vehicle, as a truck, often does not fill the cargo space and must be restrained to prevent damage to the cargo and to the vehicle.

BRIEF SUMMARY OF THE INVENTION

The invention is concerned with a cargo lock block and a cargo restraining system using the lock block.

One feature of the invention is a cargo lock block for slidable and reversible mounting on a cargo restraining bar. The block comprises a body having two oppositely directed cargo engaging surfaces with different configurations, for selective engagement with a complimentary cargo surface. More particularly, one of the cargo engaging surfaces is concave to engage a convex cargo surface and the other has two planar surface portions at right angles to each other to engage a corner of a carton or the like.

Another feature is that the lock block body has a channel therethrough to receive the cargo restraining bar; and that the cargo engaging surfaces are spaced apart along the length of the channel so that reversing the block on the bar selects the surface for engagement with the cargo.

A further feature is a cargo restraining system for cargo carried in a vehicle having a floor and spaced apart walls which comprises a cargo restraining bar extending between the walls and a pair of cargo lock blocks slidable on the bar, the blocks having facing surfaces, one on each block, for engaging an article of cargo resting on the vehicle floor.

And another feature is that the cargo lock block body is of a resilient material having a high coefficient of friction.

Further features and advantages of the invention will readily be apparent from the following description and from the drawings.

BRIEF DESCRIPTION OF THE SEVERAL VIEW OF THE DRAWINGS

FIG. 1 is a fragmentary plan view of a vehicle cargo space showing cargo restraining bars and cargo lock blocks with a rectangular cargo;

FIG. 2 is an elevation taken along line 2—2 of FIG. 1;

FIG. 3 is a broken plan view similar to FIG. 1 with a cylindrical cargo;

DETAILED DESCRIPTION OF THE INVENTION

Figure 4:
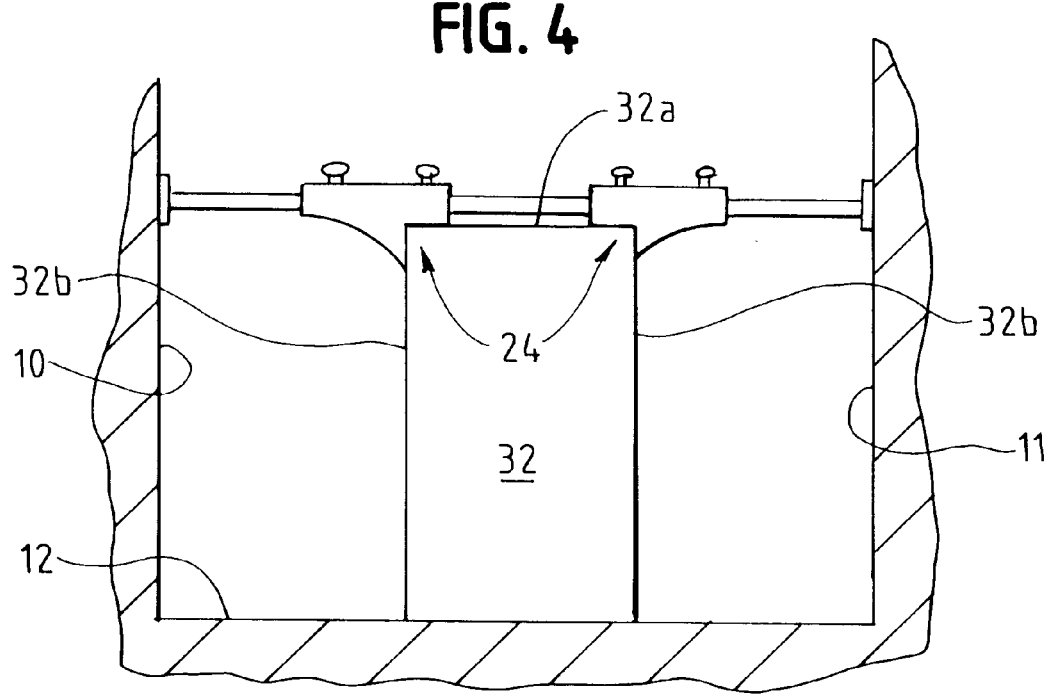
FIG. 4 is an elevation showing a restraining bar and lock blocks engaging the top surface of the cargo.

The cargo space of a vehicle, as the bed of a pick-up truck or the interior of a panel truck, van or trailer is illustrated in FIGS. 1–4 having sidewalls 10, 11 and a floor or bed 12. Items of cargo must be restrained against movement as the vehicle starts, stops and turns. Rarely will a vehicle have a full load such that the cargo is tightly packed and needs no restraint.

The cargo restraint system is illustrated in FIGS. 1 and 2 with a six sided carton or rectangular parallelepiped item of cargo 15 Four cargo restraining bars 16 extend between the vehicle sidewalls 10 and 11, there being two bars in front of the cargo and two in the rear, one near the bottom of the cargo and the other near the top thereof. The cargo restraining bars 16 are identical and have a plate and resilient pad 16a at each end for engagement with the vehicle walls 10, 11. Each bar has two telescoped sections 16b, 16c and is adjustable in length to fit between the walls of vehicles of different widths. A suitable bar is shown in Barnes U.S. Pat. No. 4,343,578.

Figure 5:
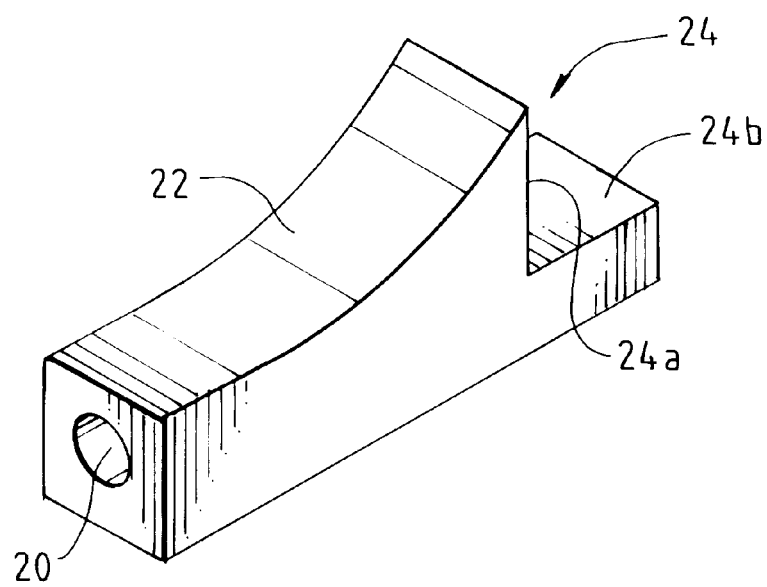
FIG. 5 is a perspective of the cargo lock block.

Two cargo lock blocks 18 on each cargo restraining bar engage the corners of cargo 15 holding it against movement. The cargo lock block 18, FIG. 5, is preferably molded of a thermoplastic rubber material with a high coefficient of friction which enhances the holding action. The block has an elongated body with an axial channel 20 which slidably fits over cargo restraining bar 16. Two cargo engaging surfaces 22, 24 are provided on one side of block 18. Surface 22 is concave, for engagement with a complimentary round cargo item; and is preferably a segment of a cylinder about an axis which is at right angles to the direction in which the block 18 is slidable on bar 16. Surface 24 has two planar surface portions, 24a and 24b, at right angles to each other, to engage right angle related surfaces of cargo, as the corner of a rectangular carton. Surfaces 22 and 24 are oppositely directed, surface 22 being directed to the left and surface 24 to the right in FIG. 5. Blocks 18 can be reversed on the restraining bar 16 so that the appropriate surface is engaged with the cargo. End plates 16a are readily removable from bar sections 16b, 16c so that cargo blocks 18 can be slid off and reversed depending on the configuration of the cargo.

Channel 20 through the cargo lock block is of sufficient size that the block will slide easily over either of the telescoped sections 16b, 16c of the cargo restraining bar. The cargo lock blocks 18 are held in position on the cargo restraining bar by set screws 26.

Cargo with an arcuate surface, as a cylindrical drum 30 of radius R, is restrained in FIG. 3 by four cargo lock blocks 18 with concave surfaces 22 engaging the drum surface.

The lock blocks may also be used to engage the top edge of cargo 32, FIG. 4. Bar 16 is positioned between vehicle walls 10, 11 above cargo 32. Blocks 18 are positioned with surfaces 24 engaging the top 32a and sidewall 32b of the cargo.

I claim:

1. A cargo lock block for slidable mounting on a cargo restraining bar, comprising:
    a body having a channel extending through said block, the channel having an axis and being dimensioned to receive the cargo restraining bar, for slidable mounting of said block on said cargo restraining bar, and
    a side substantially parallel with the axis of said channel, the side having two two-dimensional cargo engaging surfaces with different configurations spaced apart on the side and oppositely directed along the length of said channel, so that reversing the block on said bar selects the respective cargo engaging surface for engagement with a complementary cargo surface.

2. The cargo lock block of claim 1 wherein said body is of a resilient material having a high coefficient of friction.

3. The cargo lock block of claim 1 in which one of said cargo engaging surfaces is concave to engage a complementary convex cargo surface.

4. The cargo lock block of claim 3 in which said one surface is concave about an axis which is at right angles to the direction in which the block is slidable on the bar.

5. The cargo lock block of claim 1 in which one of the cargo engaging surfaces has two planar surface portions at right angles to each other to engage complimentary cargo surface.

6. The cargo lock block of claim 5 in which one of said surface portions is parallel to the direction in which the block is slidable on the bar and the other surface portion is at right angles to such direction.

7. The cargo lock block of claim 1 in which one of said cargo engaging surfaces is concave and the other of said cargo engaging surfaces has two planar surface portions at right angles to each other.

8. A cargo restraining system for cargo carried in a vehicle having spaced apart walls, comprising:
    a cargo restraining bar extending between said walls; and
    a pair of cargo lock blocks, each block having
        a channel extending through said block, the channel having an axis and being dimensioned to receive the cargo restraining bar for slidable mounting of each block on the cargo restraining bar, and
        a side substantially parallel with the axis of said channel, the side having two two-dimensional cargo engaging surfaces with different configurations spaced apart on the side and oppositely directed along the length of said channel, so that reversing the block on the bar selects the respective cargo engaging surface for engagement with a complementary cargo surface,
    wherein the pair of lock blocks are mounted on the cargo restraining bar such that the respective cargo engaging surface on each block opposes the other to engage opposite sides of the cargo for securing the cargo between the pair of lock blocks.

9. The cargo restraining system of claim 8 in which said cargo restraining bar has telescoped sections, one larger than the other, wherein said channel through each cargo lock block is dimensioned for receiving the larger bar section.

10. The cargo restraining system of claim 8 in which said cargo lock blocks are of a resilient material having a high coefficient of friction.

11. The cargo restraining system of claim 8 in which one of the two cargo engaging surfaces on each block is concave to engage a complementary convex cargo surface.

12. The cargo restraining system of claim 8 in which one of the two cargo engaging surfaces on each block has two planar surface portions at right angles to each other to engage complementary cargo surfaces.

* * * * *